Patented Nov. 10, 1936

2,060,016

UNITED STATES PATENT OFFICE 2,060,016

ARTIFICIAL SILK

Henri Louis Barthélemy, Rome, Ga., assignor to Tubize Chatillon Corporation, a corporation of Delaware No Drawing. Application September 26, 1934, Serial No. 745,650

11 Claims. (Cl. 106—40)

This invention relates to artificial silk, and has for its object the provision of certain improvements in the manufacture of artificial silk, as well as the provision of an improved artificial silk of reduced luster.

Artificial silk of reduced luster or of a mat appearance has been heretofore produced by incorporating mineral oil in the spinning solution. Such artificial silk, however, has an inferior "hand" quality; in other words, yarn thereof is somewhat harsh and requires a generous external oil treatment prior to fabrication, for example, into knit goods.

I have discovered that the incorporation and dispersion in the spinning solution of a suitably hydrogenated fat effects a substantial improvement in the "hand" quality of the finished artificial silk. Based on that discovery, the present invention involves incorporating and dispersing in the spinning solution an appropriately hydrogenated animal or vegetable fat, either alone or in conjunction with mineral oil, pigment or other delustering agents. The finished artificial silk of the invention, containing the finely dispersed hydrogenated fat, is of subdued luster, and is of better "hand" and more supple than artificial silk made by the heretofore known methods.

Among the hydrogenated fats that may be advantageously used in practicing the invention are hydrogenated vegetable and animal oils like cotton-seed, olive, castor and tallow oils, and similar glycerides, as well as partially hydrogenated oil of the lard-substitute variety. The hydrogenation should be carried sufficiently far so that the resulting product will not become rancid or develop objectionable odors. Hydrogenated cotton-seed oils having the following properties have been found satisfactory for the purposes of the invention:

|  | I | II | III |
|---|---|---|---|
| Solid point ° C | 28.5–30 | 25.5–27.5 | 24.5–25.5 |
| Sp. gr. 20° C | .9292 | .9278 | .9267 |
| Sap. No | 194.45–194.1 | 195.2–195.7 | 194–193.5 |
| Acid No | .06–.07 | .18–.19 | .15–.18 |
| Iodine No | 69.5 | 88.8 | 92.0 |
| Visc. Saybolt at 130° F | 135 | 122 | 117 |
| Refr. index at 42° C | 1.4592 | 1.4603 | 1.4600 |

The hydrogenated fat may be incorporated and dispersed in the spinning solution in any suitable manner. Thus, the hydrogenated oil (warmed if necessary to a temperature above its melting point) may be directly whipped or beaten into the spinning solution by means of a suitable agitating device. Preferably, the hydrogenated fat is first mixed with a portion of the spinning solution, and the resulting mixture then added to and mixed with the remainder of the spinning solution. The hydrogenated fat may be first mixed with the solvent (or preferably a portion thereof), such as the ether-alcohol solvent of nitrocellulose silk. With a viscose spinning solution, the hydrogenated fat may be whipped up into an emulsion either with 3.5% caustic soda (the concentration usually employed in dissolving xanthated cellulose), or with a portion of the main viscose batch to be treated, or with a combination of the two, by means of an appropriate agitating device.

When the hydrogenated fat is used in conjunction with a liquid oil delustering agent, it has been found convenient to preliminarily mix the hydrogenated fat with the oil, preferably warmed to facilitate solution or fine dispersion of the hydrogenated fat throughout the oil. Any white fluid mineral oil with a Saybolt viscosity of from 45 to 350 seconds at room temperature may be advantageously used as such delustering agent.

If desired, inorganic delustering agents, such as pigments and pigment-like materials, may be incorporated in the spinning solution with the hydrogenated fat or with hydrogenated fat and mineral oil.

Dispersing agents such as sulphonated castor oil or the so-called "mahogany sodium sulphonates" may, if desired, be used to facilitate the dispersion of the hydrogenated fat in the spinning solution.

Spinning of the solution is conducted in the customary manner characteristic of the particular variety of artificial silk being made. The finished silk is of subdued luster in consequence of the finely dispersed particles of hydrogenated fat submerged throughout each filament. The inclusion of the hydrogenated fat in the silk filaments gives the additional surprising and unexpected property of superior softness. In fact, the superior suppleness and softness of artificial silk of the invention is such that it is possible to knit it with 60 to 70% less coning oil, obtaining uniform stitches.

The following examples illustrate practices of the invention:

Example I

To 1000 parts of a fresh viscose solution maintained at 18° C. and containing 7% of cellulose, emulsify 60 parts of a mixture composed of:

Parts

Mineral oil of 75 sec. Saybolt viscosity at 100° F _____ 75
Partially hydrogenated cottonseed oil of iodine No. 75 _____ 25 made at 50° C. and cooled rapidly by continuous agitation to 30° C.

Spin the resulting viscose-mineral oil-hydrogenated fat emulsion after aging, and at a 10.4° Hottenroth index of ripeness, using a coagulating bath containing 9.5 parts of sulfuric acid and 20% sodium sulfate.

The luster of the yarn produced in this manner is not only similar to that of natural silk, but after desulfuration and washing, the yarn is naturally soft, with a feather-like feel, without giving it a special scour or sizing.

*Example II*

To 1000 parts of a nitrocellulose collodion containing 21% of nitrocellulose add:

10 parts of a white mineral oil of 100 sec. Saybolt viscosity
    10 parts of a commercial grade of hydrogenated cottonseed oil.

Spin, denitrate and wash the resulting regenerated cellulose yarn. It has a subdued mother-of-pearl luster and an increased softness over yarn delustered with mineral oil alone, similar to the above described yarn.

*Example III*

To 1000 parts of a fresh viscose solution, as described in Example I, emulsify 60 parts of the oily mixture and disperse thoroughly 10 parts of titanium oxide pigment.

The viscose is spun in the same bath as in Example I. The resulting yarn is as soft as the yarn produced in Example I, and is highly delustered.

It will be understood that the invention may be applied to any of the customary varieties of artificial silk. In viscose or cupra ammonium silks the hydrogenated fat is present in the spinning solution in a finely emulsified condition, while in acetonic collodion of cellulose acetate or ether-alcohol collodion of nitro-cellulose the hydrogenated fat may be in solution. In each case, after spinning the hydrogenated fat is more or less uniformly dispersed in fine or minute particles throughout the artificial silk filament.

The heterogeneous dispersion of the mixture of hydrogenated fat and mineral oil (as in the foregoing examples) gives a particularly pleasing artificial silk of subdued luster and superior softness and suppleness. The mineral oil is preferably white in color, substantially non-acid, having a Saybolt viscosity at 100° F. of from 65 to 100. It is my present belief that the superior "hand" quality of the yarn spun from a solution containing such a mixture of hydrogenated fat and mineral oil results from a crystallization of the hydrogenated fat inside each microscopic globule of mineral oil, the crystals of hydrogenated fat being somewhat similar to those of talc.

I claim:

1. Artificial silk having hydrogenated cottonseed oil finely dispersed therein in amount sufficient to improve the hand of the artificial silk.

2. Artificial silk having finely dispersed therein in amount sufficient to improve the hand and the suppleness of the artificial silk a hydrogenated vegetable oil of substantially the following character: Saponification No. 194–196, Acid No. .05–.20, Iodine No. 69–92, Saybolt viscosity at 130° F. 117–135.

3. Artificial silk having a mixture of hydrogenated fat and mineral oil finely dispersed therein in amount sufficient to improve the suppleness of the artificial silk.

4. Artificial silk having a mixture of hydrogenated cottonseed oil and mineral oil finely dispersed therein in amount sufficient to improve the hand of the artificial silk.

5. Artificial silk having a mixture of hydrogenated cottonseed oil and mineral oil finely dispersed therein in amount sufficient to delustre the artificial silk; the hydrogenated oil being of substantially the following character: Saponification No. 194–196, Acid No. .05–.20, Iodine No. 69–92, Saybolt viscosity at 130° F. 117–135, and the mineral oil being of substantially the following character: white in color, substantially non-acid, Saybolt viscosity at 100° F. 65–100.

6. A spinning solution for artificial silk wherein is incorporated and dispersed hydrogenated cotton seed oil in amount sufficient to improve the hand of artificial silk produced from said spinning solution.

7. A spinning solution for artificial silk having incorporated therein a hydrogenated vegetable oil sufficient in amount to improve the suppleness of the resulting artificial silk, the hydrogenated oil being of substantially the following character: Saponification No. 194–196, Acid No. .05–.20, Iodine No. 69–92, Saybolt viscosity at 130° F. 117–135.

8. A spinning solution for artificial silk having incorporated therein a mixture of hydrogenated fat and mineral oil sufficient in amount to improve the hand of the artificial silk produced from said spinning solution.

9. A spinning solution for artificial silk wherein is incorporated hydrogenated cotton seed oil and a mineral oil in amount sufficient to improve the suppleness of artificial silk produced from said spinning solution.

10. A spinning solution for artificial silk wherein is incorporated a hydrogenated fat and a mineral oil sufficient in amount to improve the hand of artificial silk produced from said spinning solution, the hydrogenated oil being of substantially the following character: Saponification No. 194–196, Acid No. .05–.20, Iodine No. 69–92, Saybolt viscosity at 130° F. 117–135, and the mineral oil being of substantially the following character: white in color, substantially non-acid, Saybolt viscosity at 100° F. 65–100.

11. In the manufacture of artificial silk involving the preparation of a spinning solution suitable for spinning and the spinning of said solution to form filaments, the improvement which comprises dissolving a hydrogenated fatty product in a white mineral oil having a Saybolt viscosity ranging from 45 to 350 seconds when measured at room temperature and incorporating the resulting solution into the spinning solution.

HENRI LOUIS BARTHÉLEMY.

Certificate of Correction

Patent No. 2,060,016. November 10, 1936.

HENRI LOUIS BARTHÉLEMY

It is hereby certified that error appears in the printed specification of the above numbered patent requiring correction as follows: Page 1, first column, line 45, in the table, for "194.45" read *194.5*; and that the said Letters Patent should be read with this correction therein that the same may conform to the record of the case in the Patent Office.

Signed and sealed this 5th day of January, A. D. 1937.

[SEAL]

HENRY VAN ARSDALE,
*Acting Commissioner of Patents.*